(12) United States Patent
Baur

(10) Patent No.: US 12,509,003 B2
(45) Date of Patent: Dec. 30, 2025

(54) VEHICULAR DRIVER MONITORING SYSTEM

(71) Applicant: Magna Mirrors of America, Inc., Holland, MI (US)

(72) Inventor: Michael J. Baur, Kentwood, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/935,720

(22) Filed: Nov. 4, 2024

(65) Prior Publication Data

US 2025/0058724 A1 Feb. 20, 2025

Related U.S. Application Data

(63) Continuation of application No. 18/315,607, filed on May 11, 2023, now Pat. No. 12,134,358.

(60) Provisional application No. 63/364,739, filed on May 16, 2022.

(51) Int. Cl.
| | |
|---|---|
| *B60R 11/04* | (2006.01) |
| *B60R 1/04* | (2006.01) |
| *B60R 1/12* | (2006.01) |
| *B60R 1/29* | (2022.01) |
| *B60R 1/30* | (2022.01) |
| *G06V 20/59* | (2022.01) |
| *B60R 11/00* | (2006.01) |

(52) U.S. Cl.
CPC ............... *B60R 11/04* (2013.01); *B60R 1/04* (2013.01); *B60R 1/12* (2013.01); *B60R 1/29* (2022.01); *B60R 1/30* (2022.01); *G06V 20/597* (2022.01); *B60R 2001/1253* (2013.01); *B60R 2011/0033* (2013.01); *B60R 2011/008* (2013.01)

(58) Field of Classification Search
CPC .. B60R 11/04; B60R 1/30; B60R 1/29; B60R 1/04; B60R 1/12; G06V 20/597
See application file for complete search history.

(56) References Cited

U.S. PATENT DOCUMENTS

| | | | |
|---|---|---|---|
| 4,435,042 | A | 3/1984 | Wood et al. |
| 4,436,371 | A | 3/1984 | Wood et al. |
| 4,712,879 | A | 12/1987 | Lynam et al. |
| 4,826,289 | A | 5/1989 | Vandenbrink et al. |
| 4,936,533 | A | 6/1990 | Adams et al. |
| 4,948,242 | A | 8/1990 | Desmond et al. |
| 5,066,112 | A | 11/1991 | Lynam et al. |
| 5,073,012 | A | 12/1991 | Lynam |

(Continued)

*Primary Examiner* — Mishawn N. Hunter
(74) *Attorney, Agent, or Firm* — HONIGMAN LLP

(57) ABSTRACT

A vehicular driver monitoring system includes an interior rearview mirror assembly having a mirror head accommodating a mirror reflective element. A driver monitoring camera is accommodated by the mirror head behind the mirror reflective element. With the mirror head adjusted to provide a rearward view to a driver of the equipped vehicle, (i) a normal vector of the mirror reflective element is angled away from a centerline axis of the vehicle and toward the driver side of the interior cabin of the vehicle and (ii) a principal viewing axis of the driver monitoring camera is angled more toward the centerline axis of the vehicle than the normal vector of the mirror reflective element so that the driver monitoring camera views at least a portion of the driver side of the interior cabin and at least a portion of a passenger side of the interior cabin.

43 Claims, 4 Drawing Sheets

(56) References Cited

U.S. PATENT DOCUMENTS

| | | |
|---|---|---|
| 5,076,673 A | 12/1991 | Lynam et al. |
| 5,076,674 A | 12/1991 | Lynam |
| 5,100,095 A | 3/1992 | Haan et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,327,288 A | 7/1994 | Wellington |
| 5,406,414 A | 4/1995 | O'Farrell et al. |
| 5,525,264 A | 6/1996 | Cronin et al. |
| 5,550,677 A | 8/1996 | Schofield et al. |
| 5,567,360 A | 10/1996 | Varaprasad et al. |
| 5,570,127 A | 10/1996 | Schmidt |
| 5,594,222 A | 1/1997 | Caldwell |
| 5,610,756 A | 3/1997 | Lynam et al. |
| 5,668,663 A | 9/1997 | Varaprasad et al. |
| 5,670,935 A | 9/1997 | Schofield et al. |
| 5,715,093 A | 2/1998 | Schierbeek et al. |
| 5,724,187 A | 3/1998 | Varaprasad et al. |
| 5,751,489 A | 5/1998 | Caskey et al. |
| 5,760,962 A | 6/1998 | Schofield et al. |
| 5,796,094 A | 8/1998 | Schofield et al. |
| 5,820,097 A | 10/1998 | Spooner |
| 5,877,897 A | 3/1999 | Schofield et al. |
| 5,910,854 A | 6/1999 | Varaprasad et al. |
| 6,001,486 A | 12/1999 | Varaprasad et al. |
| 6,002,511 A | 12/1999 | Varaprasad et al. |
| 6,097,023 A | 8/2000 | Schofield et al. |
| 6,154,306 A | 11/2000 | Varaprasad et al. |
| 6,158,655 A | 12/2000 | DeVries, Jr. et al. |
| 6,178,034 B1 | 1/2001 | Allemand et al. |
| 6,201,642 B1 | 3/2001 | Bos |
| 6,222,447 B1 | 4/2001 | Schofield et al. |
| 6,310,611 B1 | 10/2001 | Caldwell |
| 6,318,870 B1 | 11/2001 | Spooner et al. |
| 6,320,176 B1 | 11/2001 | Schofield et al. |
| 6,320,282 B1 | 11/2001 | Caldwell |
| 6,329,925 B1 | 12/2001 | Skiver et al. |
| 6,369,804 B1 | 4/2002 | Sandbach |
| 6,396,397 B1 | 5/2002 | Bos et al. |
| 6,437,258 B1 | 8/2002 | Sandbach |
| 6,449,082 B1 | 9/2002 | Agrawal et al. |
| 6,452,479 B1 | 9/2002 | Sandbach |
| 6,480,103 B1 | 11/2002 | McCarthy et al. |
| 6,483,438 B2 | 11/2002 | DeLine et al. |
| 6,485,081 B1 | 11/2002 | Bingle et al. |
| 6,492,980 B2 | 12/2002 | Sandbach |
| 6,498,620 B2 | 12/2002 | Schofield et al. |
| 6,501,465 B2 | 12/2002 | Sandbach |
| 6,501,536 B1 | 12/2002 | Fredricks |
| 6,504,531 B1 | 1/2003 | Sandbach |
| 6,540,193 B1 | 4/2003 | DeLine |
| 6,552,342 B2 | 4/2003 | Holz et al. |
| 6,559,435 B2 | 5/2003 | Schofield et al. |
| 6,590,719 B2 | 7/2003 | Bos |
| 6,593,565 B2 | 7/2003 | Heslin et al. |
| 6,598,980 B2 | 7/2003 | Marusawa et al. |
| 6,621,411 B2 | 9/2003 | McCarthy et al. |
| 6,627,918 B2 | 9/2003 | Getz et al. |
| 6,690,268 B2 | 2/2004 | Schofield et al. |
| 6,698,905 B1 | 3/2004 | Whitehead |
| 6,703,925 B2 | 3/2004 | Steffel |
| 6,717,610 B1 | 4/2004 | Bos et al. |
| 6,757,109 B2 | 6/2004 | Bos |
| 6,768,420 B2 | 7/2004 | McCarthy et al. |
| 6,783,167 B2 | 8/2004 | Bingle et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,877,709 B2 | 4/2005 | March et al. |
| 6,922,292 B2 | 7/2005 | Bos |
| 6,946,978 B2 | 9/2005 | Schofield |
| 7,004,606 B2 | 2/2006 | Schofield |
| 7,038,577 B2 | 5/2006 | Pawlicki et al. |
| 7,097,226 B2 | 8/2006 | Bingle et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,446,924 B2 | 11/2008 | Schofield et al. |
| 7,477,758 B2 | 1/2009 | Piirainen et al. |
| 7,480,149 B2 | 1/2009 | DeWard et al. |
| 7,626,749 B2 | 12/2009 | Baur et al. |
| 7,636,188 B2 | 12/2009 | Baur et al. |
| 7,720,580 B2 | 5/2010 | Higgins-Luthman |
| 7,722,199 B2 | 5/2010 | DeWard et al. |
| 7,741,666 B2 | 6/2010 | Nozaki et al. |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,256,821 B2 | 9/2012 | Lawlor et al. |
| 8,258,932 B2 | 9/2012 | Wahlstrom |
| 8,277,059 B2 | 10/2012 | McCabe et al. |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,727,547 B2 | 5/2014 | McCabe et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 8,922,422 B2 | 12/2014 | Klar et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,280,202 B2 | 3/2016 | Gieseke et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,598,016 B2 | 3/2017 | Blank et al. |
| 9,609,757 B2 | 3/2017 | Steigerwald |
| 9,616,815 B2 | 4/2017 | Mohan |
| 9,701,258 B2 | 7/2017 | Tiryaki |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,247,941 B2 | 4/2019 | Fursich |
| 10,261,648 B2 | 4/2019 | Uken et al. |
| 10,264,219 B2 | 4/2019 | Mleczko et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,735,664 B2 | 8/2020 | Kunihiro |
| 10,769,434 B2 | 9/2020 | Weller et al. |
| 10,906,463 B2 | 2/2021 | Pflug et al. |
| 10,908,417 B2 | 2/2021 | Fürsich |
| 10,922,563 B2 | 2/2021 | Nix et al. |
| 10,946,798 B2 | 3/2021 | Fürsich et al. |
| 10,958,830 B2 | 3/2021 | Koravadi |
| 11,167,771 B2 | 11/2021 | Caron et al. |
| 11,201,994 B2 | 12/2021 | Ihlenburg et al. |
| 11,205,083 B2 | 12/2021 | Lynam |
| 11,214,199 B2 | 1/2022 | LaCross et al. |

(56) References Cited

U.S. PATENT DOCUMENTS

| | | |
|---|---|---|
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,639,134 B1 | 5/2023 | Huizen et al. |
| 11,691,567 B2 | 7/2023 | Huizen et al. |
| 11,780,372 B2 | 10/2023 | Sobecki et al. |
| 11,816,905 B2 * | 11/2023 | Kasarla .................. B60R 11/00 |
| 11,890,990 B2 | 2/2024 | Huizen et al. |
| 12,134,358 B2 | 11/2024 | Baur |
| 2001/0022550 A1 | 9/2001 | Steffel |
| 2002/0005999 A1 | 1/2002 | Hutzel et al. |
| 2002/0024713 A1 | 2/2002 | Roberts et al. |
| 2004/0252993 A1 | 12/2004 | Sato |
| 2006/0050018 A1 | 3/2006 | Hutzel et al. |
| 2006/0171704 A1 | 8/2006 | Bingle et al. |
| 2007/0182528 A1 | 8/2007 | Breed et al. |
| 2008/0310005 A1 | 12/2008 | Tonar et al. |
| 2009/0024436 A1 | 1/2009 | Ingman et al. |
| 2009/0040778 A1 | 2/2009 | Takayanagi et al. |
| 2009/0135493 A1 | 5/2009 | Takayanagi et al. |
| 2010/0085653 A1 | 4/2010 | Uken et al. |
| 2010/0214791 A1 | 8/2010 | Schofield |
| 2011/0080481 A1 | 4/2011 | Bellingham |
| 2011/0084198 A1 | 4/2011 | McCabe et al. |
| 2011/0188122 A1 | 8/2011 | Habibi et al. |
| 2012/0236136 A1 | 9/2012 | Boddy |
| 2013/0258512 A1 | 10/2013 | Raz et al. |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2016/0221509 A1 | 8/2016 | Takada et al. |
| 2017/0177935 A1 | 6/2017 | Weller et al. |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 | 6/2019 | Lintz et al. |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0031693 A1 * | 2/2021 | Larson .................. B60R 1/088 |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0229309 A1 | 7/2022 | Laskin et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |
| 2023/0302994 A1 | 9/2023 | Miller et al. |
| 2024/0017610 A1 | 1/2024 | Ravichandran et al. |
| 2024/0064274 A1 | 2/2024 | Blank et al. |

* cited by examiner

VEHICULAR DRIVER MONITORING SYSTEM

CROSS REFERENCE TO RELATED APPLICATIONS

The present application is a continuation of U.S. patent application Ser. No. 18/315,607, filed May 11, 2023, now U.S. Pat. No. 12,134,358, which claims the filing benefits of U.S. provisional application Ser. No. 63/364,739, filed May 16, 2022, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

A vehicular driver monitoring system includes a vehicular interior rearview mirror assembly. The mirror assembly includes a mirror head adjustably attached at a mounting base, the mounting base configured to attach at an interior portion of a vehicle equipped with the vehicular driver monitoring system. The mirror head includes a mirror reflective element. With the mounting base attached at the interior portion of the vehicle, the mirror head and the mirror reflective element are adjustable relative to the mounting base to adjust a rearward view of a driver of the vehicle when viewing the mirror reflective element. With the mounting base attached at the interior portion of the vehicle, adjusting the mirror head and mirror reflective element relative to the mounting base adjusts a first angle between a normal vector of the mirror reflective element and a centerline axis of the vehicle. A driver monitoring camera is accommodated by the mirror head behind the mirror reflective element and views through the mirror reflective element. With the mounting base attached at the interior portion of the vehicle, a second angle between a principal axis of a field of view of the driver monitoring camera and the normal vector of the mirror reflective element is an oblique angle.

These and other objects, advantages, purposes and features of the present invention will become apparent upon review of the following specification in conjunction with the drawings.

DESCRIPTION OF THE PREFERRED EMBODIMENTS

Figure 1:
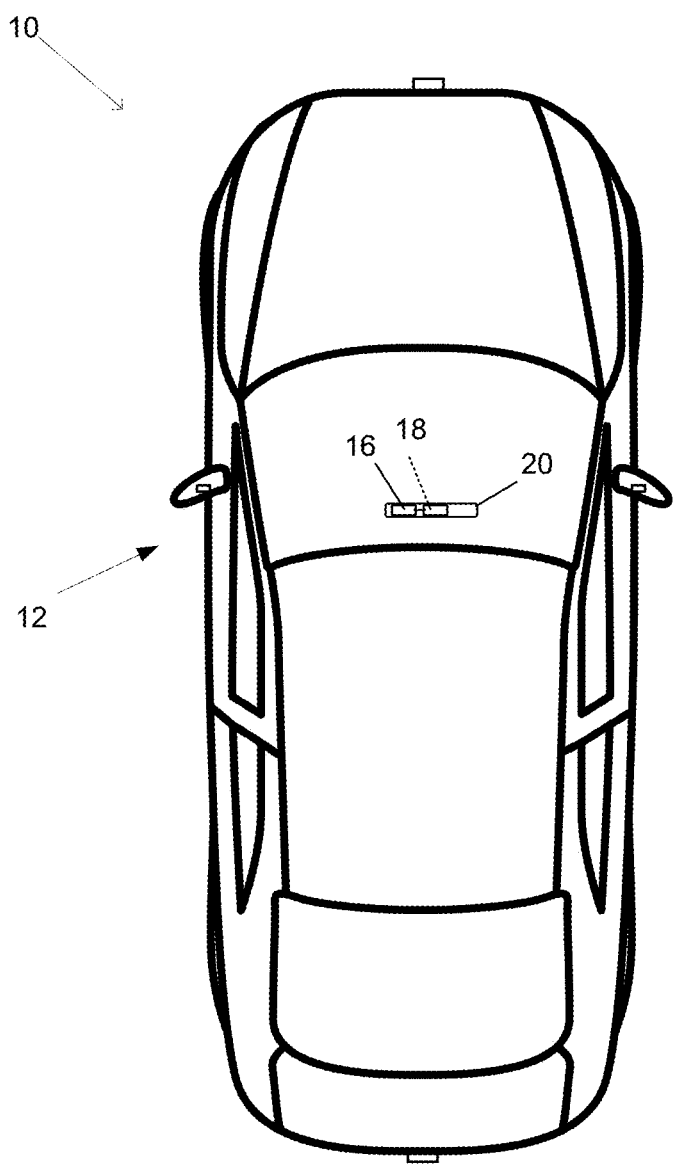
FIG. 1 is a plan view of a vehicle equipped with a driver monitoring system.

Referring now to the drawings and the illustrative embodiments depicted therein, a vehicle 10 includes a driver monitoring system 12 that includes at least one interior viewing imaging sensor or camera, such as a rearview mirror imaging sensor or camera 16 (FIG. 1). Optionally, an interior viewing camera may be disposed at the windshield of the vehicle, such as an interior viewing camera accommodated by a windshield electronics module mounted at the cabin facing side of the vehicle windshield. The vision system 12 includes a control or electronic control unit (ECU) 18 having electronic circuitry and associated software, with the electronic circuitry including a data processor or image processor that is operable to process image data captured by the sensor or camera or cameras, whereby the system 12, via processing of captured image data at the ECU 18, may monitor driver attentiveness or the like (although shown in FIG. 1 as being part of or incorporated in or at an interior rearview mirror assembly 20 of the vehicle, the control and/or the display device may be disposed elsewhere at or in the vehicle). The data transfer or signal communication from the sensor or camera to the ECU may comprise any suitable data or communication link, such as a vehicle network bus or the like of the equipped vehicle.

The vision system may incorporate a driver monitoring system (DMS) and/or an occupant monitoring system (OMS) using a camera placed near or at or within the rearview mirror assembly (e.g., behind the glass of the rearview mirror). Placement of a camera (or other imaging sensor) within or at the rearview mirror presents unique challenges. For example, the rearview mirror may be adjusted within a broad range by drivers to optimize their rear visibility (e.g., based on a height of the driver), and this adjustment changes the field of view (i.e., the "aim") of the camera. Another challenge includes differences between left-hand drive vehicles and right-hand drive vehicles. These differences may require unique camera assemblies for ideal aim at the driver. Additionally, when optimizing the monitoring system in order to include one or more occupants, such as all occupants of the vehicle, within the field of view of the camera during a variety of different conditions requires sacrificing driver-specific visibility. That is, a field of view that encompasses one or more occupants, such as each occupant of the vehicle, may not align with a mirror orientation for the driver. Moreover, a significant portion of the field of view of the camera (or other image sensor) may include irrelevant portions (e.g., the headliner) of the vehicle and as such, processing these portions of the field of view may waste processing resources.

Figure 2:
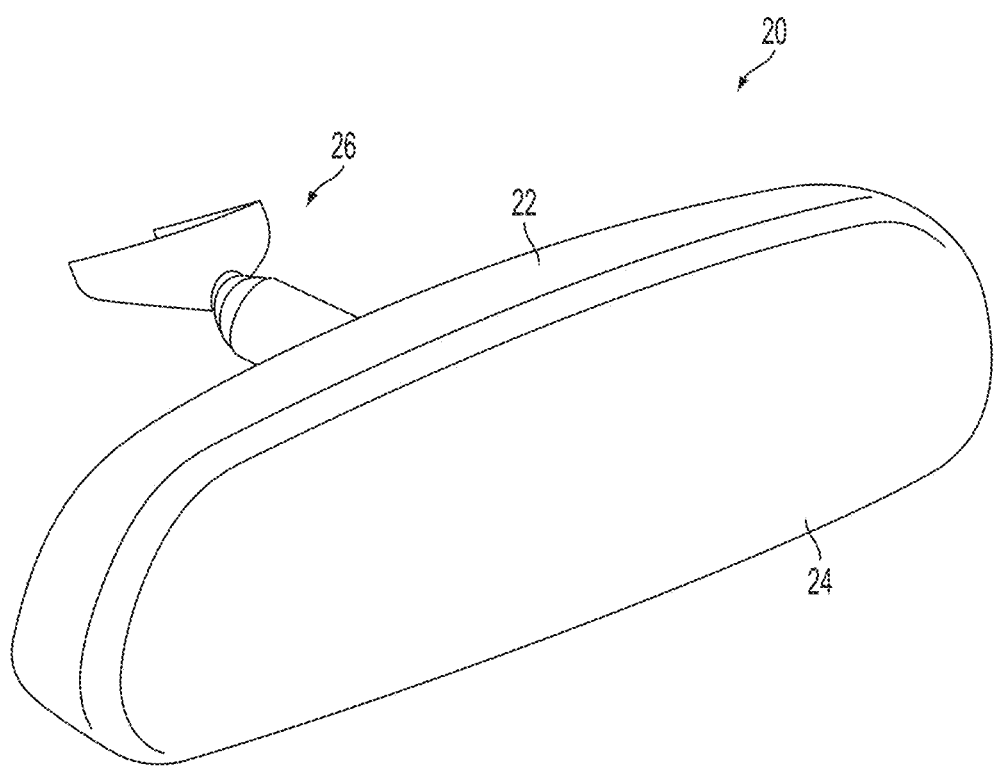
FIG. 2 is a perspective view of an interior rearview mirror assembly of the vehicle of FIG. 1.

As shown in FIG. 2, the mirror head of the interior rearview mirror assembly 20 includes a casing 22 and a reflective element 24 positioned at a front portion of the casing 22. In the illustrated embodiment, the mirror assembly 20 is configured to be adjustably mounted to an interior portion of a cabin of the vehicle (such as to an interior or in-cabin surface of the vehicle windshield or a headliner of the vehicle or the like) via a mounting structure or mounting configuration or assembly 26. The mirror reflective element 24 may comprise any suitable mirror reflective element, such as a variable reflectance mirror reflective element that varies its reflectance responsive to electrical current applied to conductive coatings or layers of the reflective element.

The mirror assembly 20 includes or is associated with the driver monitoring system (DMS), with the mirror assembly 20 including a driver/occupant monitoring camera 28 disposed at a back plate (and viewing through an aperture of the back plate) behind the reflective element 24 and viewing through the reflective element toward at least a head region of the driver of the vehicle. Optionally, the DMS 12 includes a near infrared light emitter disposed at the back plate and electrically operable to emit near infrared light through another aperture of the back plate and through the reflective element 24. The DMS and DMS camera may utilize characteristics of the driver monitoring systems and cameras described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, which are hereby incorporated herein by reference in their entireties.

Figure 3:
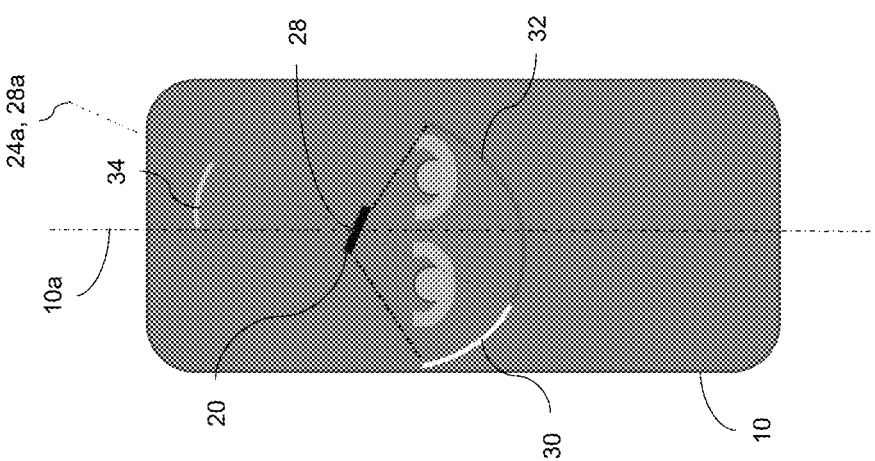
FIG. 3 is a plan view of a vehicle including a driver monitoring camera that views through a mirror reflective element of the interior rearview mirror assembly at a perpendicular angle relative to a plane of the mirror reflective element.

As shown in FIG. 3, the DMS camera 28 may be accommodated within the mirror head or casing 22 and view through the mirror reflective element 24 such that the camera 28 views perpendicular or normal to the plane of the mirror reflective element 24. That is, a principal axis 28a of the field of view of the camera 28 is parallel to a normal vector 24a of the mirror reflective element. The camera 28 may be oriented this way so that the camera 28 captures images representative of both a driver of the vehicle and a passenger or occupant of the vehicle within the field of view of the camera.

The field of view of the camera may be divided into a driver portion 30 and an occupant portion 32, where the driver portion 30 includes a driver region of the vehicle (and processing of image data representative of the driver portion of the field of view may be used for the DMS) and the occupant portion 32 includes a passenger region of the vehicle (and processing of image data representative of the occupant portion of the field of view may be used for the OMS). The driver portion 30 and the occupant portion 32 may be separated and bounded by the principal axis 28a of the field of view of the camera 28. In other words, the driver portion 30 is toward the driver side of the vehicle (e.g., left in FIG. 3) on the corresponding side of the camera's viewing axis 28a and the occupant portion 32 is toward the passenger side of the vehicle (e.g., right in FIG. 3) on the other side of the camera's viewing axis 28a. Thus, in the illustrated embodiment of FIG. 3, when the mirror head is adjusted toward the driver to provide the field of view rearward of the vehicle, and thus the normal vector 24a of the mirror reflective element is directed toward the driver, the principal axis 28a of the field of view of the camera 28 is also directed toward the driver and the driver portion 30 is significantly smaller than the occupant portion 32. Because the DMS processes the image data to, for example, determine driver attentiveness, driver drowsiness, and/or a gaze direction of the driver, having a smaller portion of the field of view include the driver of the vehicle may reduce the accuracy and capabilities of the DMS.

That is, for the execution of DMS or cameras viewing through the reflective element of the mirror, the system must achieve the field of view of both the driver and passenger while also accounting for the operating positions of the mirror. Typically, the camera is mounted perpendicular to the plane of the reflective surface. The first angle or mirror angle 34 between the normal vector 24a of the mirror reflective element 24 and a centerline axis 10a of the vehicle 10 is adjusted by the driver to create the field of view when driving the vehicle. When the mirror angle 34 is adjusted, the driver portion 30 and occupant portion 32 of the field of view are likewise affected. In particular, the right-hand side portion (the occupant portion 32 in FIG. 3) becomes extreme (i.e., relatively large) in respect to the angle of the camera for left hand drive (LHD) vehicles and the left-hand side portion (the driver portion 30 in FIG. 3) becomes extreme for right hand drive (RHD) vehicles. That is, the occupant portion 32 of the field of view is relatively large compared to the driver portion 30 when the mirror is positioned to provide the field of view to the driver of the vehicle.

Figure 4A:
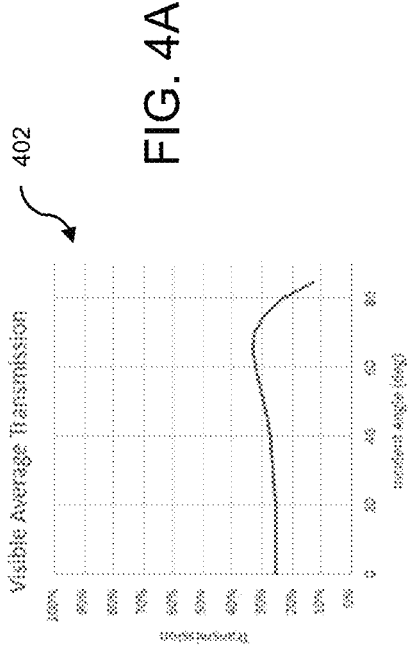
FIGS. 4A and 4B are diagrams showing the transmission of visible and infrared or near infrared light, respectively, for the mirror reflective element of the driver monitoring system of FIG. 3.
Figure 4B:
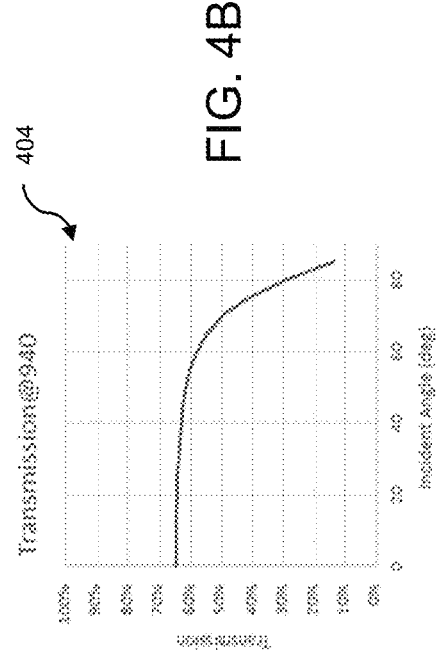

Additionally, in some cases, the transmission of light (including an IR spectrum) is significantly affected by this extreme angle, as shown in FIGS. 4A and 4B. As shown by the respective diagrams 402, 404 of FIGS. 4A and 4B, when the camera 28 is positioned perpendicular to the mirror reflective element, transmission of visible light through the mirror reflective element (for capturing image data) (FIG. 4A) and transmission of infrared or near infrared light through the mirror reflective element (for invisible illumination of objects within the vehicle) (FIG. 4B) is limited and may be reduced as the mirror angle 34 increases.

Figure 5:
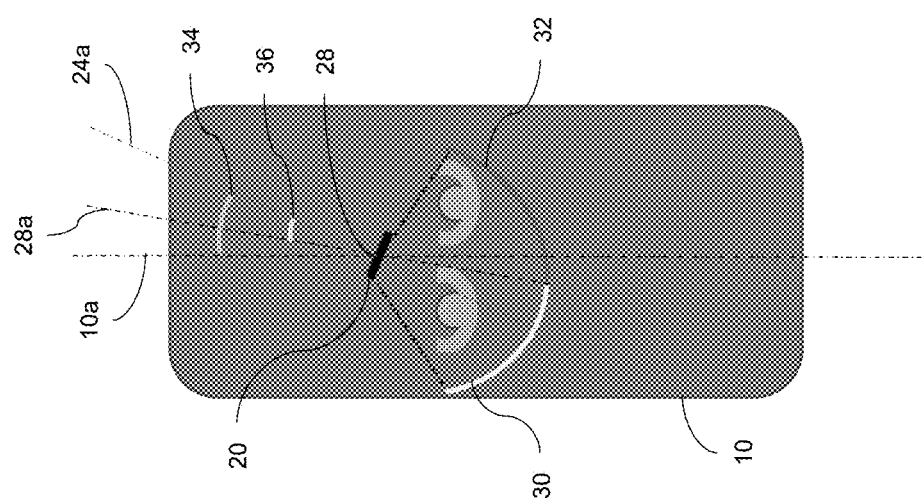
FIG. 5 is a plan view of a vehicle including a driver monitoring camera that views through the mirror reflective element at an oblique angle relative to the plane of the mirror reflective element.

As shown in FIG. 5, the driver monitoring camera 28 may be positioned within the mirror head at an angle 36 relative to the mirror reflective element 24. In other words, a second angle or camera angle 36 may be formed between the principal axis 28a of the field of view of the camera 28 and the normal vector 24a of the mirror reflective element 24. The angle 36 may be an oblique or non-right angle so that light may more easily pass through the mirror reflective element 24 and be captured by an imager of the camera 28. Similarly, the IR transmitter may be positioned at the same or a different oblique or non-right angle relative to the plane of the mirror reflective element 24.

Additionally, positioning the camera 28 at the oblique angle 36 relative to the mirror reflective element 24 reduces the disparity between the size of the driver portion 30 of the field of view and the occupant portion 32 of the field of view when the mirror head is adjusted to provide the field of view to the driver of the vehicle. In other words, the camera 28 may be angled away from the driver side of the vehicle and toward the passenger side of the vehicle so that, when the mirror head is tilted or angled toward the driver side of the vehicle, the principal axis 28a of the camera 28 is closer to the centerline 10a of the vehicle than the normal vector 24a of the mirror reflective element 24 is to the centerline 10a. Thus, the driver portion 30 and the passenger portion 32 are more equal than when the camera is perpendicular to the plane of the mirror reflective element.

Thus, the camera may be mounted so that is not perpendicular to the surface of the glass, but it is biased to one side for LHD vehicles or to the other side for RHD vehicles. The new angle becomes less extreme and hence allows for better transmission of light through the mirror reflective element.

The camera 28 may be fixed relative to the mirror casing and/or mirror reflective element 24 so that the angle 36 between the principal axis 28a of the camera 28 and the normal vector 24a of the mirror reflective element 24 remains constant. That is, the driver monitoring camera 28 may move in tandem with the mirror head when the mirror head and the mirror reflective element are adjusted relative to the mounting base.

Optionally, the position of the camera 28 relative to the mirror reflective element 24 may be adjustable, such as relative to the mirror casing or mounting base, to adjust the angle 36 between the principal axis 28a of the field of view of the camera 28 and the normal vector 24a of the mirror reflective element 24. In other words, the camera 28 is adjusted relative to the mirror head and/or mounting structure to adjust the angle 36 between the principal axis 28a of the field of view of the camera 28 and the normal vector 24a of the mirror reflective element 24. The camera 28 may be moved or pivoted via an actuator disposed at the mirror assembly (e.g., an actuator disposed within the mirror head) or the camera 28 may be pivoted manually and/or responsive to an input from the user.

For example, the position or viewing angle of the camera may be adjustable based on processing of image data captured by the camera to determine an optimized viewing angle for transmission of light through the mirror reflective element or for capturing images of a driver or occupant. For example, the system may determine that no occupant is present in the field of view and adjust the viewing angle of the camera to primarily capture image data of the driver's region of the vehicle. That is, the camera 28 may be adjusted from a position where the viewing axis 28a is directed more toward the centerline axis 10a than the normal vector 24a of the mirror reflective element 24 (to capture more equivalently sized driver portion 30 and occupant portion 32) toward a position where the viewing axis 28a is parallel with the normal vector 24a or directed further from the centerline axis 10a than the normal vector 24a (to capture a larger sized driver portion 30). When the system determines that an occupant is present in the field of view, the system may adjust the viewing angle of the camera toward the centerline axis of the vehicle to capture portions of the driver side of the vehicle cabin and the passenger side of the vehicle cabin. Optionally, the camera may be fixed (e.g., with a viewing axis that is at an oblique angle relative to the normal vector) and the system may adjust an angle of the mirror reflective element relative to the mounting structure to adjust the field of view of the camera, such as by a relatively small amount so as to improve the field of view of the camera without significantly changing the rearward view provided by the mirror reflective element.

Figure 6:
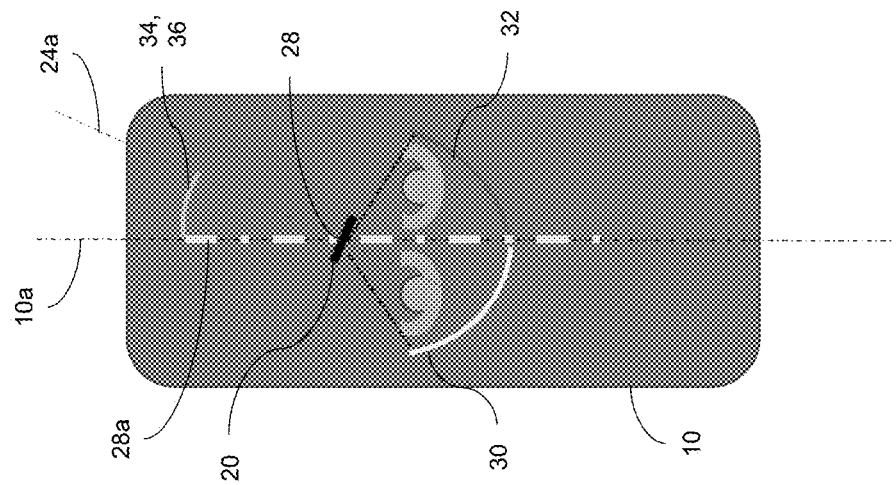
FIG. 6 is a plan view of a vehicle including a driver monitoring camera that is fixed and where the mirror reflective element moves relative to the camera as the mirror head and mirror reflective element are adjusted relative to the fixed driver monitoring camera.

As shown in FIG. 6, the viewing angle or axis 28a of the camera 28 may be fixed relative to the centerline 10a of the vehicle and movement of the mirror head and mirror reflective element 24 relative to the camera 28 may adjust the angle 36 between the principal axis 28a of the field of view of the camera 28 and the normal vector 24a of the mirror reflective element 24. In other words, the camera 28 is fixed and the mirror head moves or pivots relative to and about the camera 28. For example, the axis 28a of the camera 28 may be fixed and parallel to the centerline axis 10a of the vehicle. Thus, the field of view of the camera 28 may include a substantially equal sized driver portion 30 and a substantially equal sized occupant portion 32. When the axis 28a of the camera 28 is fixed parallel to the centerline axis 10a of the vehicle, the first angle 34 between the normal vector 24a of the reflective element 24 and the centerline axis 10a of the vehicle is equal to the second angle 36 between the axis 28a of the camera 28 and the normal vector 24a of the reflective element 24.

The camera 28 may be fixed relative to the mounting base assembly 26 with the mirror head pivotally attached to the mounting base. For example, the camera 28 may be attached at the mounting base 26 and the mirror casing 22 may be attached at the mounting base around or surrounding the camera 28 so that the camera is housed within the mirror casing 22 behind the mirror reflective element 24. The mirror casing may provide a gap or clearance at or around the mounting base to allow for pivotal adjustment of the mirror reflective element and mirror casing relative to the mounting base to allow for adjustment of the rearward view of the driver.

As a further example, the camera 28 may be disposed at a pivot joint pivotally connecting the mirror casing 22 to the mounting base assembly 26 where the camera 28 is disposed at an end region of the pivot ball of the pivot joint received in a socket of the mirror casing where the socket comprises an aperture to allow the camera to view through the mirror reflective element. As the mirror casing 22 and mirror reflective element 24 are adjusted relative to the mounting base, the mirror casing 22 and mirror reflective element 24 move relative to the camera 28 and the camera 28 remains fixed at the mounting base.

Optionally, the mirror casing and camera may remain fixed relative to the mounting base and the mirror reflective element may be adjusted relative to the mirror casing to adjust the view of the driver and to adjust the angle of the camera 28 relative to the mirror reflective element. For example, an actuator may be operated to pivot or tilt the mirror reflective element within the mirror casing to adjust the rearward field of view of the driver.

That is, the camera may remain fixed relative to the centerline of the vehicle and the mirror is arranged to pivot about the camera. In this way, both the left-hand side portion (here, the driver portion 30) of the field of view for LHD vehicles and the right-hand side portion (here, the occupant portion 32) of the field of view for RHD vehicles can remain unaffected regardless of the angle of adjustment.

The mirror reflective element may comprise a laminate construction variable reflectance electro-optic (such as electrochromic) reflective element assembly having a front substrate and a rear substrate with an electro-optic medium (such as electrochromic medium) sandwiched therebetween and bounded by a perimeter seal. The front substrate may have a front or first surface (the surface that generally faces the driver of a vehicle when the mirror assembly is normally mounted at the vehicle) and a rear or second surface opposite the front surface, and rear substrate may have a front or third surface and a rear or fourth surface opposite the front surface, with the electro-optic medium disposed between the second surface and the third surface and bounded by the perimeter seal of the reflective element (such as is known in the electrochromic mirror art). The second surface may have a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface may have a metallic reflector coating (or multiple layers or coatings) established thereat. The front or third surface of the rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element).

The third surface may define an active EC area or surface of the rear substrate within the perimeter seal. The coated third surface may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

The interior mirror assembly may comprise a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

The mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

The camera or sensor captures image data for the driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular driver monitoring system, the vehicular driver monitoring system comprising:
    an interior rearview mirror assembly comprising a mirror head adjustable about a mounting structure configured to mount the interior rearview mirror assembly at an interior portion of an interior cabin of a vehicle equipped with the vehicular driver monitoring system, wherein the mirror head accommodates a mirror reflective element;
    wherein the equipped vehicle comprises a centerline axis that longitudinally bisects the interior cabin of the equipped vehicle;
    wherein, with the interior rearview mirror assembly mounted at the interior portion of the equipped vehicle, and with a driver of the equipped vehicle seated at a driver side of the interior cabin of the equipped vehicle, the mirror head is adjustable by the driver of the equipped vehicle relative to the mounting structure to adjust a rearward view provided by the mirror reflective element to the driver of the equipped vehicle;
    a driver monitoring camera accommodated by the mirror head;
    wherein, with the interior rearview mirror assembly mounted at the interior portion of the equipped vehicle, the driver monitoring camera moves together and in tandem with the mirror head when the mirror head is adjusted by the driver of the equipped vehicle relative to the mounting structure to provide the rearward view to the driver of the equipped vehicle;
    wherein a principal viewing axis of the driver monitoring camera is not parallel to a normal vector of the mirror reflective element that extends perpendicular from a planar front surface of the mirror reflective element; and
    wherein, with the interior rearview mirror assembly mounted at the interior portion of the equipped vehicle, and with the mirror head adjusted by the driver of the equipped vehicle relative to the mounting structure to provide the rearward view to the driver of the equipped vehicle, (i) the normal vector of the mirror reflective element is angled away from the centerline axis that longitudinally bisects the interior cabin of the equipped vehicle and toward the driver side of the interior cabin of the equipped vehicle and (ii) the principal viewing axis of the driver monitoring camera is angled more toward the centerline axis of the equipped vehicle than the normal vector of the mirror reflective element so that the driver monitoring camera views at least a portion of the driver side of the interior cabin of the equipped vehicle and at least a portion of a passenger side of the interior cabin of the equipped vehicle.

2. The vehicular driver monitoring system of claim 1, wherein, with the interior rearview mirror assembly mounted at the interior portion of the equipped vehicle, and with the mirror head adjusted by the driver of the equipped vehicle relative to the mounting structure to provide the rearward view to the driver of the equipped vehicle, the vehicular driver monitoring system is operable to detect presence of a passenger at the passenger side of the interior cabin of the equipped vehicle via processing of image data captured by the driver monitoring camera.

3. The vehicular driver monitoring system of claim 1, wherein the principal viewing axis of the driver monitoring camera is at an angle relative to the normal vector of the mirror reflective element, and wherein, with the interior rearview mirror assembly mounted at the interior portion of the equipped vehicle, the angle between the principal viewing axis of the driver monitoring camera and the normal vector of the mirror reflective element remains constant as the mirror head is adjusted relative to the mounting structure.

4. The vehicular driver monitoring system of claim 1, wherein the at least a portion of the passenger side of the interior cabin of the equipped vehicle comprises where a front passenger seat is located within the interior cabin of the equipped vehicle.

5. The vehicular driver monitoring system of claim 1, wherein the interior portion of the equipped vehicle comprises an in-cabin side of a windshield of the equipped vehicle.

6. The vehicular driver monitoring system of claim 1, comprising a near infrared light emitter accommodated by the mirror head, wherein the near infrared light emitter, when electrically powered to emit light, emits near infrared light.

7. The vehicular driver monitoring system of claim 6, wherein, with the interior rearview mirror assembly mounted at the interior portion of the equipped vehicle, the near infrared light emitter moves together and in tandem with the mirror head as the mirror head is adjusted relative to the mounting structure.

8. The vehicular driver monitoring system of claim 7, wherein the near infrared light emitter, when electrically powered to emit light, emits near infrared light having a principal axis of illumination.

9. The vehicular driver monitoring system of claim 8, wherein the principal axis of illumination of the near infrared light emitter is not parallel to the normal vector of the mirror reflective element.

10. The vehicular driver monitoring system of claim 9, wherein, with the interior rearview mirror assembly mounted at the interior portion of the equipped vehicle, and with the normal vector angled toward the driver side of the interior cabin of the equipped vehicle, the principal axis of illumination of the near infrared light emitter is angled more toward the centerline axis of the equipped vehicle than the normal vector of the mirror reflective element.

11. The vehicular driver monitoring system of claim 7, wherein the driver monitoring camera is accommodated by the mirror head behind the mirror reflective element and views through the mirror reflective element, and wherein the near infrared light emitter is accommodated by the mirror head behind the mirror reflective element, and wherein the near infrared light emitter, when electrically powered to emit light, emits near infrared light that passes through the mirror reflective element.

12. The vehicular driver monitoring system of claim 1, wherein the driver monitoring camera is accommodated by the mirror head behind the mirror reflective element and views through the mirror reflective element.

13. The vehicular driver monitoring system of claim 1, wherein the mirror reflective element comprises a transflective mirror reflector.

14. The vehicular driver monitoring system of claim 13, wherein the mirror reflective element comprises an electro-optic mirror reflective element.

15. The vehicular driver monitoring system of claim 14, wherein the electro-optic mirror reflective element comprises a front planar glass substrate and a rear planar glass substrate, and wherein the front planar glass substrate comprises a first planar glass surface separated from a second planar glass surface by a plate thickness dimension of the front planar glass substrate, and wherein the planar front surface of the mirror reflective element comprises the first planar glass surface of the front planar glass substrate, and wherein the rear planar glass substrate comprises a third planar glass surface separated from a fourth planar glass surface by a plate thickness dimension of the rear planar glass substrate, and wherein the second planar glass surface of the front planar glass substrate has a transparent electrically conductive coating disposed thereat, and wherein the third planar glass surface of the rear planar glass substrate has the transflective mirror reflector disposed thereat, and wherein an electrochromic medium is disposed between and contacts the transparent electrically conductive coating disposed at the second planar glass surface of the front planar glass substrate and the transflective mirror reflector disposed at the third planar glass surface of the rear planar glass substrate.

16. The vehicular driver monitoring system of claim 13, wherein the mirror reflective element comprises a prismatic mirror reflective element, and wherein the prismatic mirror reflective element comprises a glass substrate, and wherein the glass substrate has a wedge-shaped cross-section having a first planar glass surface separated from a second planar glass surface, and wherein the planar front surface of the mirror reflective element comprises the first planar glass surface of the glass substrate, and wherein a plane of first planar glass surface slopes at an angle relative to a plane of the second planar glass surface, and wherein the second planar glass surface is an uncoated glass surface, and wherein the transflective mirror reflector is disposed at the second planar glass surface of the glass substrate of the prismatic mirror reflective element.

17. The vehicular driver monitoring system of claim 1, wherein the mirror head accommodates electronic circuitry that comprises a processor operable to process image data captured by the driver monitoring camera, and wherein, with the interior rearview mirror assembly mounted at the interior portion of the equipped vehicle, the processor processes image data captured by the driver monitoring camera to determine at least one selected from the group consisting of (i) driver attentiveness, (ii) driver drowsiness and (iii) driver gaze direction.

18. The vehicular driver monitoring system of claim 1, wherein, with the interior rearview mirror assembly mounted at the interior portion of the equipped vehicle, a processor of the equipped vehicle processes image data captured by the driver monitoring camera to determine at least one selected from the group consisting of (i) driver attentiveness, (ii) driver drowsiness and (iii) driver gaze direction.

19. A vehicular driver monitoring system, the vehicular driver monitoring system comprising:
  an interior rearview mirror assembly comprising a mirror head adjustable about a mounting structure configured to mount the interior rearview mirror assembly at an interior portion of an interior cabin of a vehicle equipped with the vehicular driver monitoring system, wherein the mirror head accommodates a mirror reflective element having a transflective mirror reflector;
  wherein the interior portion of the equipped vehicle comprises an in-cabin side of a windshield of the equipped vehicle;
  wherein the equipped vehicle comprises a centerline axis that longitudinally bisects the interior cabin of the equipped vehicle;
  wherein, with the interior rearview mirror assembly mounted at the interior portion of the equipped vehicle, and with a driver of the equipped vehicle seated at a driver side of the interior cabin of the equipped vehicle, the mirror head is adjustable by the driver of the equipped vehicle relative to the mounting structure to adjust a rearward view provided by the mirror reflective element to the driver of the equipped vehicle;
  a driver monitoring camera accommodated by the mirror head behind the mirror reflective element and views through the transflective mirror reflector of the mirror reflective element;
  a near infrared light emitter accommodated by the mirror head behind the mirror reflective element, wherein the near infrared light emitter, when electrically powered to emit light, emits near infrared light that passes through the transflective mirror reflector of the mirror reflective element;
  wherein, with the interior rearview mirror assembly mounted at the interior portion of the equipped vehicle, the driver monitoring camera and the near infrared light emitter move together and in tandem with the mirror head when the mirror head is adjusted by the driver of the equipped vehicle relative to the mounting structure to provide the rearward view to the driver of the equipped vehicle;

wherein a principal viewing axis of the driver monitoring camera is not parallel to a normal vector of the mirror reflective element that extends perpendicular from a planar front surface of the mirror reflective element; and wherein, with the interior rearview mirror assembly mounted at the interior portion of the equipped vehicle, and with the mirror head adjusted by the driver of the equipped vehicle relative to the mounting structure to provide the rearward view to the driver of the equipped vehicle, (i) the normal vector of the mirror reflective element is angled away from the centerline axis that longitudinally bisects the interior cabin of the equipped vehicle and toward the driver side of the interior cabin of the equipped vehicle and (ii) the principal viewing axis of the driver monitoring camera is angled more toward the centerline axis of the equipped vehicle than the normal vector of the mirror reflective element so that the driver monitoring camera views at least a portion of the driver side of the interior cabin of the equipped vehicle and at least a portion of a passenger side of the interior cabin of the equipped vehicle.

20. The vehicular driver monitoring system of claim 19, wherein, with the interior rearview mirror assembly mounted at the interior portion of the equipped vehicle, and with the mirror head adjusted by the driver of the equipped vehicle relative to the mounting structure to provide the rearward view to the driver of the equipped vehicle, the vehicular driver monitoring system is operable to detect presence of a passenger at the passenger side of the interior cabin of the equipped vehicle via processing of image data captured by the driver monitoring camera.

21. The vehicular driver monitoring system of claim 19, wherein the principal viewing axis of the driver monitoring camera is at an angle relative to the normal vector of the mirror reflective element, and wherein, with the interior rearview mirror assembly mounted at the interior portion of the equipped vehicle, the angle between the principal viewing axis of the driver monitoring camera and the normal vector of the mirror reflective element remains constant as the mirror head is adjusted relative to the mounting structure.

22. The vehicular driver monitoring system of claim 19, wherein the at least a portion of the passenger side of the interior cabin of the equipped vehicle comprises where a front passenger seat is located within the interior cabin of the equipped vehicle.

23. The vehicular driver monitoring system of claim 19, wherein the near infrared light emitter, when electrically powered to emit light, emits near infrared light having a principal axis of illumination.

24. The vehicular driver monitoring system of claim 23, wherein the principal axis of illumination of the near infrared light emitter is not parallel to the normal vector of the mirror reflective element.

25. The vehicular driver monitoring system of claim 24, wherein, with the interior rearview mirror assembly mounted at the interior portion of the equipped vehicle, and with the normal vector angled toward the driver side of the interior cabin of the equipped vehicle, the principal axis of illumination of the near infrared light emitter is angled more toward the centerline axis of the equipped vehicle than the normal vector of the mirror reflective element.

26. The vehicular driver monitoring system of claim 19, wherein the mirror reflective element comprises an electro-optic mirror reflective element.

27. The vehicular driver monitoring system of claim 26, wherein the electro-optic mirror reflective element comprises a front planar glass substrate and a rear planar glass substrate, and wherein the front planar glass substrate comprises a first planar glass surface separated from a second planar glass surface by a plate thickness dimension of the front planar glass substrate, and wherein the planar front surface of the mirror reflective element comprises the first planar glass surface of the front planar glass substrate, and wherein the rear planar glass substrate comprises a third planar glass surface separated from a fourth planar glass surface by a plate thickness dimension of the rear planar glass substrate, and wherein the second planar glass surface of the front planar glass substrate has a transparent electrically conductive coating disposed thereat, and wherein the third planar glass surface of the rear planar glass substrate has the transflective mirror reflector disposed thereat, and wherein an electrochromic medium is disposed between and contacts the transparent electrically conductive coating disposed at the second planar glass surface of the front planar glass substrate and the transflective mirror reflector disposed at the third planar glass surface of the rear planar glass substrate.

28. The vehicular driver monitoring system of claim 19, wherein the mirror reflective element comprises a prismatic mirror reflective element, and wherein the prismatic mirror reflective element comprises a glass substrate, and wherein the glass substrate has a wedge-shaped cross-section having a first planar glass surface separated from a second planar glass surface, and wherein the planar front surface of the mirror reflective element comprises the first planar glass surface of the glass substrate, and wherein a plane of first planar glass surface slopes at an angle relative to a plane of the second planar glass surface, and wherein the second planar glass surface is an uncoated glass surface, and wherein the transflective mirror reflector is disposed at the second planar glass surface of the glass substrate of the prismatic mirror reflective element.

29. The vehicular driver monitoring system of claim 19, wherein the mirror head accommodates electronic circuitry that comprises a processor operable to process image data captured by the driver monitoring camera, and wherein, with the interior rearview mirror assembly mounted at the interior portion of the equipped vehicle, the processor processes image data captured by the driver monitoring camera to determine at least one selected from the group consisting of (i) driver attentiveness, (ii) driver drowsiness and (iii) driver gaze direction.

30. The vehicular driver monitoring system of claim 19, wherein, with the interior rearview mirror assembly mounted at the interior portion of the equipped vehicle, a processor of the equipped vehicle processes image data captured by the driver monitoring camera to determine at least one selected from the group consisting of (i) driver attentiveness, (ii) driver drowsiness and (iii) driver gaze direction.

31. A vehicular driver monitoring system, the vehicular driver monitoring system comprising:
an interior rearview mirror assembly comprising a mirror head adjustable about a mounting structure configured to mount the interior rearview mirror assembly at an interior portion of an interior cabin of a vehicle equipped with the vehicular driver monitoring system, wherein the mirror head accommodates an electrochromic mirror reflective element;

wherein the interior portion of the equipped vehicle comprises an in-cabin side of a windshield of the equipped vehicle;

wherein the electrochromic mirror reflective element comprises a front planar glass substrate and a rear planar glass substrate;

wherein the front planar glass substrate comprises a first planar glass surface separated from a second planar glass surface by a plate thickness dimension of the front planar glass substrate;

wherein the rear planar glass substrate comprises a third planar glass surface separated from a fourth planar glass surface by a plate thickness dimension of the rear planar glass substrate;

wherein the second planar glass surface of the front planar glass substrate has a transparent electrically conductive coating disposed thereat, and wherein the third planar glass surface of the rear planar glass substrate has a mirror reflector disposed thereat, and wherein an electrochromic medium is disposed between and contacts the transparent electrically conductive coating disposed at the second planar glass surface of the front planar glass substrate and the mirror reflector disposed at the third planar glass surface of the rear planar glass substrate;

wherein the equipped vehicle comprises a centerline axis that longitudinally bisects the interior cabin of the equipped vehicle;

wherein, with the interior rearview mirror assembly mounted at the interior portion of the equipped vehicle, and with a driver of the equipped vehicle seated at a driver side of the interior cabin of the equipped vehicle, the mirror head is adjustable by the driver of the equipped vehicle relative to the mounting structure to adjust a rearward view provided by the electrochromic mirror reflective element to the driver of the equipped vehicle;

a driver monitoring camera accommodated by the mirror head;

wherein, with the interior rearview mirror assembly mounted at the interior portion of the equipped vehicle, the driver monitoring camera moves together and in tandem with the mirror head when the mirror head is adjusted by the driver of the equipped vehicle relative to the mounting structure to provide the rearward view to the driver of the equipped vehicle;

wherein a principal viewing axis of the driver monitoring camera is not parallel to a normal vector of the electrochromic mirror reflective element that extends perpendicular from the first planar glass surface of the electrochromic mirror reflective element; and wherein, with the interior rearview mirror assembly mounted at the interior portion of the equipped vehicle, and with the mirror head adjusted by the driver of the equipped vehicle relative to the mounting structure to provide the rearward view to the driver of the equipped vehicle, (i) the normal vector of the electrochromic mirror reflective element is angled away from the centerline axis that longitudinally bisects the interior cabin of the equipped vehicle and toward the driver side of the interior cabin of the equipped vehicle and (ii) the principal viewing axis of the driver monitoring camera is angled more toward the centerline axis of the equipped vehicle than the normal vector of the electrochromic mirror reflective element so that the driver monitoring camera views at least a portion of the driver side of the interior cabin of the equipped vehicle and at least a portion of a passenger side of the interior cabin of the equipped vehicle where a front passenger seat is located within the interior cabin of the equipped vehicle.

32. The vehicular driver monitoring system of claim 31, wherein, with the interior rearview mirror assembly mounted at the interior portion of the equipped vehicle, and with the mirror head adjusted by the driver of the equipped vehicle relative to the mounting structure to provide the rearward view to the driver of the equipped vehicle, the vehicular driver monitoring system is operable to detect presence of a passenger at the passenger side of the interior cabin of the equipped vehicle via processing of image data captured by the driver monitoring camera.

33. The vehicular driver monitoring system of claim 31, wherein the principal viewing axis of the driver monitoring camera is at an angle relative to the normal vector of the electrochromic mirror reflective element, and wherein, with the interior rearview mirror assembly mounted at the interior portion of the equipped vehicle, the angle between the principal viewing axis of the driver monitoring camera and the normal vector of the electrochromic mirror reflective element remains constant as the mirror head is adjusted relative to the mounting structure.

34. The vehicular driver monitoring system of claim 31, comprising a near infrared light emitter accommodated by the mirror head, wherein the near infrared light emitter, when electrically powered to emit light, emits near infrared light.

35. The vehicular driver monitoring system of claim 34, wherein, with the interior rearview mirror assembly mounted at the interior portion of the equipped vehicle, the near infrared light emitter moves together and in tandem with the mirror head as the mirror head is adjusted relative to the mounting structure.

36. The vehicular driver monitoring system of claim 35, wherein the near infrared light emitter, when electrically powered to emit light, emits near infrared light having a principal axis of illumination.

37. The vehicular driver monitoring system of claim 36, wherein the principal axis of illumination of the near infrared light emitter is not parallel to the normal vector of the electrochromic mirror reflective element.

38. The vehicular driver monitoring system of claim 37, wherein, with the interior rearview mirror assembly mounted at the interior portion of the equipped vehicle, and with the normal vector angled toward the driver side of the interior cabin of the equipped vehicle, the principal axis of illumination of the near infrared light emitter is angled more toward the centerline axis of the equipped vehicle than the normal vector of the electrochromic mirror reflective element.

39. The vehicular driver monitoring system of claim 35, wherein the driver monitoring camera is accommodated by the mirror head behind the electrochromic mirror reflective element and views through the electrochromic mirror reflective element, and wherein the near infrared light emitter is accommodated by the mirror head behind the electrochromic mirror reflective element, and wherein the near infrared light emitter, when electrically powered to emit light, emits near infrared light that passes through the electrochromic mirror reflective element.

40. The vehicular driver monitoring system of claim 31, wherein the driver monitoring camera is accommodated by the mirror head behind the electrochromic mirror reflective element and views through the electrochromic mirror reflective element.

41. The vehicular driver monitoring system of claim 31, wherein the mirror reflector of the electrochromic mirror reflective element comprises a transflective mirror reflector.

42. The vehicular driver monitoring system of claim 31, wherein the mirror head accommodates electronic circuitry that comprises a processor operable to process image data captured by the driver monitoring camera, and wherein, with the interior rearview mirror assembly mounted at the interior portion of the equipped vehicle, the processor processes image data captured by the driver monitoring camera to determine at least one selected from the group consisting of (i) driver attentiveness, (ii) driver drowsiness and (iii) driver gaze direction.

43. The vehicular driver monitoring system of claim 31, wherein, with the interior rearview mirror assembly mounted at the interior portion of the equipped vehicle, a processor of the equipped vehicle processes image data captured by the driver monitoring camera to determine at least one selected from the group consisting of (i) driver attentiveness, (ii) driver drowsiness and (iii) driver gaze direction.

* * * * *